United States Patent
Sugihara et al.

(10) Patent No.: US 8,324,341 B2
(45) Date of Patent: Dec. 4, 2012

(54) AGENT SERVING AS OXIDANT AND DOPANT FOR CONDUCTIVE POLYMER PRODUCTION, AN ALCOHOL SOLUTION THEREOF, A CONDUCTIVE POLYMER SYNTHESIZED BY USING THE SAME, AND A SOLID ELECTROLYTIC CAPACITOR USING THE CONDUCTIVE POLYMER AS A SOLID ELECTROLYTE

(75) Inventors: Ryousuke Sugihara, Osaka (JP); Masayuki Kondo, Osaka (JP); Yuhei Tsurumoto, Osaka (JP)

(73) Assignee: Tayca Corporation, Osaka-shi (JP)

( * ) Notice: Subject to any disclaimer, the term of this patent is extended or adjusted under 35 U.S.C. 154(b) by 285 days.

(21) Appl. No.: 12/522,077

(22) PCT Filed: Jun. 17, 2008

(86) PCT No.: PCT/JP2008/061013
§ 371 (c)(1),
(2), (4) Date: Jul. 2, 2009

(87) PCT Pub. No.: WO2009/001707
PCT Pub. Date: Dec. 31, 2008

(65) Prior Publication Data
US 2010/0085686 A1  Apr. 8, 2010

(30) Foreign Application Priority Data
Jun. 26, 2007 (JP) .................................. 2007-167090

(51) Int. Cl.
C08G 75/00 (2006.01)
(52) U.S. Cl. .......................... 528/377; 528/380; 528/373
(58) Field of Classification Search .................. 528/377, 528/380, 373
See application file for complete search history.

(56) References Cited

U.S. PATENT DOCUMENTS

| 2004/0171790 A1* | 9/2004 | Baik et al. ................ 528/378 |
| 2005/0237696 A1 | 10/2005 | Takeda et al. |
| 2006/0152884 A1 | 7/2006 | Yoshimitsu et al. |

FOREIGN PATENT DOCUMENTS

| JP | 2002-138137 A | 5/2002 |
| JP | 2003-160647 A | 6/2003 |
| JP | 2004-107552 A | 4/2004 |
| JP | 2004-265927 A | 9/2004 |
| JP | 2004-288958 A | 10/2004 |
| JP | 2007-023090 | * 1/2007 |
| JP | 2007-23090 A | 2/2007 |

OTHER PUBLICATIONS

International Search Report of PCT/JP2008/061013, Mailing Date of Aug. 26, 2008.

* cited by examiner

Primary Examiner — Shane Fang
(74) Attorney, Agent, or Firm — Westerman, Hattori, Daniels & Adrian, LLP

(57) ABSTRACT

The present invention provides an agent serving as oxidant and dopant in which it does not generate precipitates in a state of an alcohol solution for a certain period of time and the oxidizing power is not too strong. By using the same, the present invention provides a conductive polymer having a high conductivity and heat resistance. By using the same, the present invention provides a solid electrolytic capacitor reliable under a high temperature condition. The present invention provides an agent serving as oxidant and dopant for conductive polymer production, the agent serving as oxidant and dopant comprising: a ferric salt of acids comprising a benzene sulfonic acid derivative represented by formula (1) and sulfuric acid. "R" represents an alkyl or alkoxy group having a carbon number of 1 to 4. More than 90 mole % of the benzene sulfonic acid derivative have R at the para position with respect to the $SO_3H$ group. Sulfuric acid is contained at 0.05 to 1.5 mass % in the acids. An alkali metal and alkali earth metal as an inorganic alkali component are included at a total content of 300 ppm or less (based on mass). ammonia and an amine as an organic alkali component are included at a total content of 0.01 mole % or less. A pH value is 1.5 to 3.0 when the agent serving as oxidant and dopant is made into an aqueous solution at a concentration of 8 mass %.

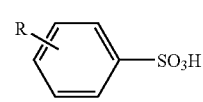

(1)

11 Claims, No Drawings

AGENT SERVING AS OXIDANT AND DOPANT FOR CONDUCTIVE POLYMER PRODUCTION, AN ALCOHOL SOLUTION THEREOF, A CONDUCTIVE POLYMER SYNTHESIZED BY USING THE SAME, AND A SOLID ELECTROLYTIC CAPACITOR USING THE CONDUCTIVE POLYMER AS A SOLID ELECTROLYTE

TECHNICAL FIELD

The present invention relates to an agent serving as oxidant (oxidizer) and dopant for conductive polymer production, an alcohol solution thereof, a conductive polymer synthesized by using the same, and a solid electrolytic capacitor using the conductive polymer as a solid electrolyte.

BACKGROUND OF THE ART

A conductive polymer has a high conductivity so that it can be used as a solid electrolyte solid of an electrolytic capacitor such as aluminum solid electrolytic capacitor, tantalum solid electrolytic capacitor and niobium solid electrolytic capacitor.

With regard to the conductive polymer for the application, ones obtained through chemical oxidative polymerization or electrolytic oxidation polymerization of polymerizable monomers such as thiophene or its derivatives can be used.

As dopants for performing chemical oxidative polymerization of thiophene or its derivatives as a polymerizable monomer, organic sulfonic acids can be mainly used. Among them, aromatic sulfonic acids are said to be favorable. As oxidants, transition metals can be used. Among them, ferric compounds are said to be favorable. Usually, ferric salts of aromatic sulfonic acids can be used for an agent serving as oxidant and dopant for the purposed of chemical oxidative polymerization of thiophene or its derivatives.

In particular, among the ferric salts of aromatic sulfonic acids, it is said that ferric toluenesulfonate or ferric methoxybenzenesulfonate can be favorably used. See Patent Publications Nos. 1 and 2 below.

However, a conductive polymer, prepared by using ferric toluenesulfonate as an agent serving as oxidant and dopant, is not enough in such properties as initial resistance and heat resistance. Also, a conductive polymer, prepared by using ferric methoxybenzenesulfonate as an agent serving as oxidant and dopant, is better than the conductive polymer using ferric toluenesulfonate in the initial resistance and heat resistance, but it is still is not fully satisfied with.

This is because ferric toluenesulfonate and ferric methoxybenzenesulfonate are solid and they are generally used in a condition of an alcohol solution, but precipitates generate during storage.

Therefore, an alcohol solution of ferric toluenesulfonate or ferric methoxybenzenesulfonate, having precipitated, becomes lower in the homogeneousness. Thus, the solid electrolytic capacitor using thereby obtained conductive polymer, i.e., a solid electrolyte, results in lowering the ESR (equivalent series resistance) and high temperature stability.

Also, it was reported that by constituting a ferric salt of a certain benzenesulfonic acid derivative as an agent serving as oxidant and dopant and by lowering the water content therein, a conductive polymer having lowered initial resistance and excellent in the heat resistance can be obtained. See Patent publication No. 3 below.

However, such a method cannot produce a conductive polymer fully satisfied with required properties. This is because the oxidizing power of the agent serving as oxidant and dopant is too strong oxidative power to generate a side reaction.

Patent Publication No. 1: JP laid-open patent publication No. 2003-160647
Patent Publication No. 2: JP laid-open patent publication No. 2004-265927
Patent Publication No. 3: JP laid-open patent publication No. 2007-023090

DISCLOSURE OF INVENTION

Objectives of the Invention

With regard to the alcohol solution of an agent serving as oxidant and dopant used for synthesizing a conductive polymer to obtain a solid electrolytic capacitor in which its ESR and high temperature stability do not decrease, it is required that it does not generate precipitates for an extended time of at least 6 months and that the oxidizing power of the agent serving as oxidant and dopant is not too strong.

Therefore, the present invention provides an agent serving as oxidant and dopant in which it does not generate precipitates in a state of an alcohol solution for a certain period of time and the oxidizing power is not too strong. The present invention also provides a conductive polymer by using the agent serving as oxidant and dopant or the alcohol solution to perform an oxidation polymerization of a polymerizable monomer such as thiophene or its derivatives, the conductive polymer having a high conductivity and an excellent heat resistance. The present invention further provides a solid electrolytic capacitor reliable under a high temperature condition by using the conductive polymer as a solid electrolyte.

Means to Solve the Objectives

The inventors of the present invention have considered in order to solve the objectives as discussed above. The present invention has been accomplished by constituting an agent serving as oxidant and dopant by a ferric salt of acids composed of a certain benzenesulfonic acid derivative and sulfuric acid, in which the content of the cation component other than iron is restricted within a certain value, and in which the pH value of the aqueous solution is adjusted within a certain range.

According to the present invention, there is provided an agent serving as oxidant and dopant for conductive polymer production. The agent serving as oxidant and dopant comprising: a ferric salt of acids comprising a benzene sulfonic acid derivative represented by formula (1) and sulfuric acid.

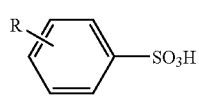
(1)

In Formula, "R" represents an alkyl or alkoxy group having a carbon number of 1 to 4. More than 90 mole % of the benzene sulfonic acid derivative have the group R at the para position of the $SO_3H$ group. Sulfuric acid is contained at 0.05 to 1.5 mass % in the acids. An inorganic alkali component, i.e., an alkali metal and alkali earth metal, is included at a total content of 300 ppm or less (based on mass). An organic alkali component, i.e., ammonia and an amine, is included at a total content of 0.01 mole % or less. A pH value is from 1.5 to 3.0 when the agent serving as oxidant and dopant is made into an aqueous solution at a concentration of 8 mass %.

According to the present invention, there is also provided an alcohol solution of the agent serving as oxidant and dopant for synthesizing a conductive polymer in which the agent serving as oxidant and dopant is solved in an alcohol at a concentration of 30 mass % or more, wherein the alcohol solution has a water content of 5 mass % or less.

According to the present invention, there is also provided a conductive polymer which is synthesized by oxidation polymerization of a polymerizable monomer such as thiophene or its derivative by using the agent serving as oxidant and dopant, or an alcohol solution thereof.

Further, according to the present invention, there is provided a solid electrolytic capacitor using the conductive polymer as a solid electrolyte.

EFFECT OF INVENTION

By the agent serving as oxidant and dopant for conductive polymer production of the present invention, a conductive polymer having a high conductivity and excellent heat resistance can be prepared. Also, the conductive polymer synthesized by using the agent serving as oxidant and dopant for conductive polymer production of the present invention can be used as a solid electrolyte to provide a solid electrolytic capacitor reliable under a high temperature condition.

Furthermore, the alcohol solution of the agent serving as oxidant and dopant for conductive polymer production of the present invention is excellent in the preservation stability, such that it does not generate precipitates for a long term. Therefore, the use of the alcohol solution can stably synthesize a conductive polymer having a high conductivity and being excellent in the heat resistance for a long term.

BEST EMBODIMENT TO CARRY OUT THE INVENTION

In the present invention, a ferric salt of acids comprising a benzene sulfonic acid derivative represented by formula (1) and sulfuric acid (which is hereinafter referred to as "ferric salt of a benzene sulfonic acid derivative and sulfuric acid" for simplification) is used for serving as an agent serving as oxidant and dopant. As the benzene sulfonic acid derivative, one represented by formula (1) in which more than 90 mole % of the benzene sulfonic acid derivative have the group "R" at the para position of the $SO_3H$ group. The reason why the benzene sulfonic acid derivative has a high content of the para-positioned compound is to obtain a conductive polymer having a high conductivity.

Each benzenesulfonic acid derivative has ortho-compound, meta-compound and para-compound. In the present invention, it has been not yet proven why the use of the benzenesulfonic acid derivatives including the para-compound at a high content can produce a conductive polymer having a high conductivity, but it is considered that the reason is because the stereoregularity of the synthesized conductive polymer can be increased in case of a high content the para-compound, resulting in increasing the conductivity. In other words, it is considered that when the group of "R" representing an alkyl or alkoxy group is combined at a position other than para-position of the $SO_3H$ group, it becomes a stereoscopic obstacle, resulting in impairing the conductivity of thereby obtained conductive polymer, therefore decreasing the conductivity.

It is required that the content of the para-compound of the benzenesulfonic acid derivative can be 90 mole % or more in the whole of the benzenesulfonic acid derivative. Where the content of the para-compound is less than 90 mole %, the conductivity of the obtained conductive polymer becomes low. In particular, the content of para-compound can be 93 mole % or more. As discussed above, a ferric salt of toluenesulfonic acid or methoxybenzenesulfonic acid has been conventionally used as an agent serving as oxidant and dopant. However, the content of the para-compound of toluenesulfonic acid or methoxybenzenesulfonic acid is at most about 85 mole %. (The content of the para-compound of toluenesulfonic acid or methoxybenzenesulfonic acid becomes at most about 85 mole % when it is manufactured by a general method.) Therefore, the conductive polymer obtained by using the ferric salt as an agent serving as oxidant and dopant becomes high in the initial resistance, low in the conductivity and deteriorative in the heat resistance. On the contrary, one having a para-compound concentration of 90 mole % or more, e.g., by raising the reaction temperature or repeating the recrystallization, is used in the present invention.

In Formula (1) of the benzenesulfonic acid derivative of the present invention, "R" represents an alkyl or alkoxy group having a carbon number of 1 to 4. The example of the derivatives can include: ones having R being an alkyl group, such as toluenesulfonic acid, ethylbenzenesulfonic acid, propylbenzenesulfonic acid and butylbenzenesulfonic acid; and ones having R being an alkoxy group, such as methoxybenzenesulfonic acid, ethoxybenzenesulfonic acid, propoxybenzenesulfonic acid and butoxybenzenesulfonic acid. Where the carbon number of the R group is more than 3, the alkyl group may be branched. As the benzenesulfonic acid derivatives, one having a carbon number of 1 in Formula (1) can be favorably used. In other words, toluenesulfonic acid and methoxybenzenesulfonic acid can be used.

In the present invention, a ferric salt of a benzenesulfonic acid derivative represented by Formula (1) and sulfuric acid is used as an agent serving as oxidant and dopant. As acid components, not only the benzenesulfonic acid derivative represented by Formula (1) but also sulfuric acid is used. This is why a conductive polymer having a high conductivity can be obtained by using sulfuric acid together. The content of sulfuric acid can be at a concentration of 0.05 to 1.5 mass % in the total of the acids. If the content of sulfuric acid is either above or below the specified range, a conductive polymer having a high conductivity cannot be obtained. In particular, the content of sulfuric acid can be favorably at a concentration of 0.1 mass % or more, and 0.9 mass % or less.

With regard to the ferric salt of a benzenesulfonic acid derivative represented by Formula (1) and sulfuric acid, it is appropriate that the benzenesulfonic acid derivative is mixed with sulfuric acid in advance to form the ferric salt. However, the premix before forming the ferric salt is not always required. Each acid may form each ferric salt, and is mixed with each other to coexist.

Also in the present invention, with regard to the ferric salt of a benzenesulfonic acid derivative represented by Formula (1) and sulfuric acid, a total content of an inorganic alkali component, i.e., alkali metal and alkali earth metal, is 300 ppm or less (based on mass); a total content of an organic alkali component, i.e., ammonia and amines, is 0.01 mole % or less; and a pH value is 1.5 to 3.0 when the agent serving as oxidant and dopant is made into an aqueous solution having a concentration of 8 mass %. The reasons of these requirements are as follows:

Most of the inorganic alkali components, i.e., an alkali metal such as Li, Na and K; and alkali earth metal such as Mg, Ca, Sr and Ba, and the organic alkali components, i.e., ammonia, amines and etc. derive from the additives to be added in order to increase the pH of the ferric salt of the benzenesulfonic acid derivative and sulfuric acid serving as an agent serving as oxidant and dopant, as explained later. If the content of these components in the ferric salt of the benzenesulfonic acid derivative and sulfuric acid is increased, a conductive polymer having a high conductivity cannot be obtained. Therefore, in the present invention, the total content of the alkali metal and alkali earth metal included in the ferric salt of the benzenesulfonic acid derivative and sulfuric acid is restricted into 300 ppm or less, and the total content of ammonia and amines is restricted to 0.01 mole % or less. Therefore, a conductive polymer having a high conductivity can be obtained. In other words, if the total content of the alkali metal and alkali earth metal is more than 300 ppm, a conductive polymer having a high conductivity cannot be obtained. If the total content of ammonia and amines is more than 0.01 mole %, a conductive polymer having a high conductivity cannot be obtained.

Where the pH value is 1.5 or less when it is made into an aqueous solution at a concentration of 8%, the reason is not proven but the solid electrolytic capacitor manufactured by using the conductive polymer that is synthesized with the agent serving as oxidant and dopant has the following features: The solid electrolytic capacitor has increased ESR, and when it is used at a high frequency, it tends to generate self-heating, so that it is not favorable in using it as a solid electrolytic capacitor. On the contrary, if the pH is more than 3.0, the chemical oxidative polymerization does not proceed.

Usually, when a ferric salt of an acid is synthesized, if the mole number of the ferric salt is less than the amount of the acid (e.g., benzenesulfonic acid derivatives) to be added, the ferric salt is not appropriately formed due to generation of a ferric hydroxide, that is, one partially oxidized. Therefore, it is required to increase the amount of the acid (e.g., benzenesulfonic acid derivatives) to be added in some degree. However, the ferric salt as formed has decreased pH value, so that when it is made into an aqueous solution, the pH value becomes about 1.0. Therefore, in order to raise the pH value, addition of a hydroxide of an inorganic alkali component (i.e., an alkali metal or alkali earth metal) or an organic alkali component (i.e., ammonia and amines) can raise the pH value. However, in such a case, the reason is not clear but when the amount of the inorganic alkali component or the organic alkali component is increased, a conductive polymer having a high conductivity cannot be obtained.

In case where the agent serving as oxidant and dopant of the present invention is used, it is usually used in an alcohol solution. The example of the alcohol can include, e.g., methanol, ethanol, propanol, butanol, pentanol and octanol. In particular, ones having a carbon number of 4 or less such as methanol, ethanol, propanol and butanol can be favorably used. Ones having an alkyl group having a carbon number of 3 or more such as propanol and butanol can be branched.

When such an alcohol solution is made, in view of efficiently producing a conductive polymer, it is preferable to adjust the concentration of the ferric salt of a benzenesulfonic acid derivative and sulfuric acid into 30 mass % or more. When the concentration of the ferric salt of a benzenesulfonic acid derivative and sulfuric acid is adjusted into 30 mass % or more, it is also preferable to adjust the water content into 5 mass % or less, and in particular, into 3 mass % or less. By lowering the water content of the alcohol solution of the agent serving as oxidant and dopant, the preservation stability is improved and a conductive polymer having a high conductivity and excellent in the heat resistance can be synthesized. It is better to make the water content as low as possible. If possible, it should be 0 mass %. With respect to lowering the water content, the effect is significant when the R group in Formula (1) is an alkoxy group. Also, if butanol is used as an alcohol, it becomes more necessary to lower the water content. If using butanol, the water content can be 1 mass % or less.

In the present invention, in order to decrease the water content of the ferric salt of a benzenesulfonic acid derivative and sulfuric acid or in order to decrease the water content of the alcohol solution thereof as an agent serving as oxidant and dopant, the following processes can be used: Condensation by distillation and addition of an azeotropic organic solvent such as methanol and ethanol in order to decrease the water content are repeated to produce an agent serving as oxidant and dopant whose functions are excellent.

In the ferric salt of a benzenesulfonic acid derivative and sulfuric acid of an agent serving as oxidant and dopant of the present invention, the benzenesulfonic acid derivative represented by Formula (1) constituting the acid component in the ferric salt can be obtained as follows: The benzenesulfonic acid derivative can be synthesized by mixing alkylbenzene having a carbon number of 1 to 4 or alkoxybenzene with concentrated sulfuric acid to cause sulfonation, and then, a purification process such as crystallization separation is performed.

The agent serving as oxidant and dopant for synthesizing the conductive polymer of the present invention is as follows: A ferric salt of acids comprises a benzene sulfonic acid derivative represented by formula (1) and sulfuric acid; more than 90 mole % of the benzene sulfonic acid derivative has R at the para position of the $SO_3H$ group; sulfuric acid is contained at 0.05 to 1.5 mass % in the acids; an inorganic alkali component as an alkali metal and alkali earth metal is included at a total content of 300 ppm or less; an organic alkali component as ammonia and an amine is included at a total content of 0.01 mole % or less; and a pH is 1.5 to 3.0 when the agent serving as oxidant and dopant is made into an aqueous solution at a concentration of 8 mass %. This agent serving as oxidant and dopant is synthesized by solving a trivalent iron salt such as ferric sulfate in water, which is then neutralized with sodium hydrate aqueous solution or aqueous ammonia solution, and thereby produced ferric hydroxide is reacted with a benzenesulfonic acid derivative represented by Formula (1) and sulfuric acid in an alcohol solvent.

Note that since the amount of sulfuric acid is a little, it is not necessarily added from the outside of the reaction system of ferric hydroxide. Sulfuric acid derived from ferric sulfate which is used as a starting material for generating ferric hydroxide can be utilized.

In the alcohol solution as an agent serving as oxidant and dopant of the present invention, the concentration of the ferric salt of a benzenesulfonic acid derivative and sulfuric acid is adjusted into 30 mass % or more. The concentration of the ferric salt of a benzenesulfonic acid derivative and sulfuric acid, depending on the solvent used, can be increased into as high as 65 mass % in case of, e.g., methanol solution or ethanol solution. In case of n-butanol solution, it can be increased into as high as 60 mass %.

The polymerizable monomer for synthesizing a conductive polymer can include, e.g., thiophene and its derivatives, pyrrole and its derivatives, aniline and its derivatives, and isothianaphthene and its derivatives.

Thiophene and its derivatives can be used in the present invention as explained abovelisted above. The thiophene derivatives can include 3,4-ethylenedioxythiophene, 3-alkylthiophene, 3-alkoxythiophene, 3-alkyl-4-alkoxythiophene, 3,4-alkylthiophene and 3,4-alkoxythiophene. The carbon number of the alkyl and alkoxy group can be 1 to 16, but in particular, 3,4-ethylenedioxythiophene can be used.

Pyrrole and its derivatives can be used in the present invention as explained above. The pyrrole derivatives can include 3,4-ethylenedioxypyrrole, 3-alkylpyrrole, 3-alkoxypyrrole, 3-alkyl-4-alkoxypyrrole, 3,4-alkylpyrrole, and 3,4-alkoxypyrrole. Aniline and its derivatives can be used in the present invention as explained above. The aniline derivatives can include m-alkylaniline and m-alkoxyaniline. Isothianaphthene and its derivatives can be used in the present invention as explained above. The isothianaphthene derivatives can include 3,4-ethylenedioxyisothianaphthene, 3-alkylisothianaphthene, 3-alkoxyisothianaphthene, 3-alkyl-4-alkoxyisothianaphthene, 3,4-alkylisothianaphthene and 3,4-alkoxy isothianaphthene.

Among the monomers listed above, thiophene and its derivatives can be particularly used in view of obtaining a conductive polymer having a high conductivity and excellent heat resistance. Therefore, with regard to the production of the conductive polymer below, the examples using thiophene and its derivatives are referred in the following explanation.

Thiophene and its derivatives are liquid, so that upon polymerization, they can be used as it is. However, in order to promote the polymerization smoothly, thiophene and its derivatives can be diluted with an organic solvent such as methanol, ethanol, propanol, butanol, acetone and acetonitrile to make a solution (an organic solution).

Upon production of the conductive polymer, a ferric salt of a benzenesulfonic acid derivative and sulfuric acid is used as an agent serving as oxidant and dopant such that thiophene or its derivatives causes a chemical oxidative polymerization. At that time, thiophene or its derivatives is provided as an organic solution in advance. Also, the ferric salt of a benzenesulfonic acid derivative and sulfuric acid is provided as an alcohol solution in advance, as explained before. Then, the solutions can be mixed together to cause a reaction for certain period. After the reaction, a conductive polymer can be obtained by washing and drying. During the chemical oxidative polymerization of thiophene or its derivatives, the ferric salts of a benzenesulfonic acid derivative and sulfuric acid serving as an agent serving as oxidant and dopant function as follows: Iron functions as an oxidant (oxidation polymerization agent) of the polymerization; and benzenesulfonic acid derivatives and sulfuric acid are included or absorbed into a polymer matrix to serve as so-called dopant. As an organic solvent used in the reaction, a solvent such as methanol, ethanol, n-propanol and n-butanol can be used, either of which can be also used in the process of washing. Usually, iron included in the ferric salts of a benzenesulfonic acid derivative and sulfuric acid serves as an oxidant during polymerization, and then, it is removed from the conductive polymer by washing. However, if thereby obtained conductive polymer is used as an solid electrolyte of an aluminum solid electrolytic capacitor, iron can remain therein.

While the explanation of the production of a conductive polymer is made with reference to thiophene or its derivatives as a polymerizable monomer, a conductive polymer can be obtained by using polymerizable monomers other than thiophene or derivatives in the same manner; i.e., pyrrole and its derivatives, aniline and its derivatives, and isothianaphthene and its derivatives.

The conductive polymer produced by the present invention has a high conductivity and excellent heat resistance, so that it can be used as a solid electrolyte for not only the aluminum solid electrolytic capacitor but also other solid electrolytic capacitors such as tantalum solid electrolytic capacitor and niobium solid electrolytic capacitor. A solid electrolyte capacitor having reliability under a high temperature condition can be provided.

Also, by utilizing the high conductivity and excellent heat resistance of the conductive polymer of the present invention, other than the solid electrolyte of a solid electrolyte capacitor, it can be used as a cathode active material of a battery, sheet of prevention of static charge, base resin for a corrosion resistance paint, and etc.

EXAMPLES

The present invention is explained in detail with reference to the examples, but the scope of the invention should not be limited into the examples.

First, the production of benzenesulfonic acid derivatives (Samples Nos. 1 to 4), which becomes a ferric salt of a benzenesulfonic acid derivative and sulfuric acid constituting an agent serving as oxidant and dopant of Examples and Comparative Examples, is explained. In the following explanation, "%" indicating the concentration and the water content of the solution and dispersion means mass % unless otherwise provided.

Sample No. 1 (Toluenesulfonic Acid in which the Para Compound was Included at 99 mole % in the Whole)

560 g of 98% sulfuric acid was dropped into 600 g of toluene with stirring. Then, the temperature was raised at 110 to 120° C. while stirring, reacting for 5 hours. After the reaction, the temperature was decreased while distillation water was added, and upon the temperature reached at about 20° C., a small amount of a crystalline of p-toluenesulfonic acid (4-methylbenzenesulfonic acid) in the system, which was provided in advance, was put therein, generating crystalline deposition of p-toluenesulfonic acid. The crystalline as obtained was collected by filtering, into which distillation water was added. Then, the temperature of the liquid was raised into 60° C. again to dissolve. Then, the temperature was gradually decreased, and upon the temperature reached at about 20° C., a small amount of a crystalline of p-toluenesulfonic acid was added to deposit crystalline. The crystalline was collected by filtering to obtain toluenesulfonic acid in which the para compound was included at 99 mole % in the total of the toluenesulfonic acid. Note that the measurement of the concentration of the para compound was carried out by using HPLC (High Performance Liquid Chromatography) manufactured by Shimadzu Corporation. The same measure was used hereinafter.

Sample 2 (Methoxybenzenesulfonic Acid in which the Para Compound was Included at 98 mole % in the Whole)

560 g of 98% sulfuric acid was dropped into 600 g of methoxybenzene. Then, while the stirring was continued, the temperature was raised into 80 to 85° C., reacting for 3 hours. After the reaction, distillation water was added, adjusting the concentration into 55%. Then, the temperature at about 40° C. was gradually cooled. Upon the temperature reached at 20° C., a small amount of a crystalline of p-methoxybenzenesulfonic acid (4-methoxybenzenesulfonic acid), which was provided in advance, was added, generating crystalline deposition of p-methoxybenzenesulfonic acid in the system. The crystalline as obtained was collected by filtering, into which water was added and the liquid temperature was again raised at 40° C. to dissolve. The concentration was adjusted to have 55%. Then, the temperature at about 40° C. was gradually cooled. Upon the temperature reached at 20° C., a small amount of a crystalline of p-methoxybenzenesulfonic acid, which was provided in advance, was added again, generating crystalline deposition of p-methoxybenzenesulfonic acid.

The crystalline was collected by filtration so as to obtain methoxybenzenesulfonic acid in which the para compound was included at 98 mole % in the whole of methoxybenzenesulfonic acid.

Sample 3 (Toluenesulfonic Acid in which the Para Compound was Included at 85 mole % in the Whole, which was Used as Comparative Examples)

560 g of 98% sulfuric acid was dropped into 560 g of toluene while stirring. Then, while the stirring was continued, the temperature was raised at 60 to 70° C., reacting for 5 hours. After the reaction, 500 g of distillation water was added. Then, 200 g of ether was added. The lower phase (water phase) of the two separated phases was taken, into which a step of distillation for condensation and addition of water was repeated twice, so as to obtain toluenesulfonic acid. As a result of analysis, the toluenesulfonic acid included the para compound thereof at a concentration of 85 mole % in the total of the toluenesulfonic acid.

Sample 4 (Methoxybenzenesulfonic Acid in which the Para Compound was Included at 86 mole % in the Whole, which was Used as Comparative Examples)

560 g of 98% sulfuric acid was dropped into 600 g of methoxybenzene while stirring. Then, while the stirring was continued, the temperature was raised at 45 to 55° C., reacting for 12 hours. After the reaction, 500 g of distillation water was added. Then, 200 g of ether was added. The lower phase (water phase) of the two separated phases was taken, into which a step of distillation for condensation and addition of water was repeated twice, so as to obtain methoxybenzenesulfonic acid. As a result of analysis, the methoxybenzenesulfonic acid included the para compound thereof at a concentration of 86 mole % in the total of the methoxybenzenesulfonic acid.

Next, using the benzenesulfonic acid derivatives of Samples Nos. 1-4, agents serving as oxidant and dopant were prepared in a state of an alcohol solution, which are used as Examples and Comparative Examples.

Example 1

As Example 1, among the benzenesulfonic acid derivatives as Samples Nos. 1-4, the toluenesulfonic acid prepared as Sample No. 1 including the para compound at an amount of 99 mole % was used. As shown in the following, n-butanoln-butanol solution as an agent serving as oxidant and dopant for conductive polymer production comprising a ferric salt of a benzenesulfonic acid derivative and sulfuric acid was prepared.

First, n-butanoln-butanol dispersion solution of ferric hydroxide to be reacted with the toluenesulfonic acid of Sample No. 1 was prepared as follows.

A solution in which 108.6 g (0.2 mole) of $Fe_2(SO_4)_3 \cdot 8H_2O$ was dissolved into 100 ml of distilled water at 25° C. was strongly stirred, into which an aqueous solution of sodium hydrate having a concentration of 5 mole/a liter was gradually added to adjust the pH into 7, and then, a clear upper portion was removed by centrifugal separation so as to obtain precipitates of ferric hydroxide. In order to remove excess water-soluble salts, the precipitates were dispersed in 400 ml of distilled water, and then, a step of removing the clear upper portion by means of centrifugal separation was repeated four times. Thereby obtained precipitates were dispersed in 500 g of n-butanol.

Apart from the description above, 0.51 mole of the toluenesulfonic acid, in which the para compound is included at an amount of 99 mole % as Sample No. 1, was dissolved in 500 g of n-butanol in advance, into which the n-butanol dispersion solution of ferric hydroxide was added. At room temperature, it stirred for 12 hours for reaction, and then, a step of condensing by distillation and adding n-butanol was repeated, so as to obtain n-butanoln-butanol solution (water content: 0.9%) of 50% of ferric salt of toluenesulfonic acid (the para compound being at 99 mole % in the total) and sulfuric acid which can be used as an agent serving as oxidant and dopant for preparing a conductive polymer.

The sulfuric acid constituting the acid portions of the ferric salt, together with the toluenesulfonic acid, is based on $Fe_2(SO_4)_3 \cdot 8H_2O$ which was used for the production of the ferric hydroxide. In other words, during the production of the ferric hydroxide, the reminder of the sulfuric acid was not completely removed, but was used for the purpose of formation of ferric salt.

While the sulfuric acid content in the ferric salt (sample) of the toluenesulfonic acid and sulfuric acid was measured by using an ion chromatography manufactured by Dionex Corporation, it was 0.4% in the total of the acids. While the total amount of inorganic alkali components, i.e., alkali metal and alkali earth metal, was measured by using ICP (inductively-coupled plasma spectrometry), it was 105 ppm. While the total amount of organic alkali components, i.e., ammonia and amines, as was measured by using an ion chromatography manufactured by Dionex Corporation, it was 0.001 mole or less (less than the detection limit). The pH of an aqueous solution whose concentration of the sample was adjusted into 8% was 1.59. Note that the pH was measured by using F-52 (Product Name) manufactured by Horiba Ltd., at 25° C. The same methods were used in the following examples.

Upon the measurement of the inorganic alkali components, the sample (the ferric salt of the toluenesulfonic acid and sulfuric acid) was diluted with pure water twenty times, which was then subject to the ICP measurement. Upon measurement of the organic alkali components, n-butanol in the sample was distilled to obtain its dry and solid form, and then, it was dried in a vacuum drier. Then, it was dissolved in pure water to be at a concentration of 20%, which was then adjusted with a sodium hydrate aqueous solution with a concentration of 5 mole/a liter so as to adjust the pH into 13.5. Then, a distillate, obtained by conducting a distillation process until it becomes dry and solid, was subject to an ion chromatography for measurement.

Example 2

In the process to obtain the ferric hydroxide in Example 1, the repeating times of the step for removing the excess water-soluble salt, i.e., the step of dispersing the precipitates in distilled water and removing the clear upper portion by means of centrifugal separation, (which is hereinafter referred to as "washing") were changed from four times to five times. Other than that, the same procedure was used to obtain n-butanoln-butanol solution (water content: 0.9%) of 50% of ferric salt of toluenesulfonic acid (the para compound being at 99 mole % in the total) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.2% in the total acids. The total amount of alkali metal and alkali earth metal as inorganic alkali components, which is hereinafter referred to as "inorganic alkali amount," was 38 ppm. The total amount of ammonia and amines as organic alkali components, which is hereinafter referred to as "organic alkali amount," was 0.001 mole % or less (less than the detection limit). The pH was 1.80.

Example 3

Instead of Sample No. 1 (toluenesulfonic acid in which the para compound was included at 99 mole % in the whole) used in Example 1, Sample 2 (methoxybenzenesulfonic acid in which the para compound was included at 98 mole % in the whole) was used. Other than that, the same procedure as Example 1 was carried out to obtain n-butanoln-butanol solution (water content: 0.9%) of 50% of ferric salt of methoxybenzenesulfonic acid (the para compound being at 98 mole % in the total) and sulfuric acid, which can be used as an agent serving as oxidant and dopant for conductive polymer production.

With respect to the obtained ferric salt of the methoxybenzenesulfonic acid and sulfuric acid, the properties were measured in the same manner as Example 1. The sulfuric acid amount was 0.4% in the total acids. The inorganic alkali amount was 110 ppm. The organic alkali amount was 0.001 mole % or less (less than the detection limit). The pH was 1.70.

Example 4

Instead of 0.51 mole of Sample No. 1 (toluenesulfonic acid in which the para compound was included at 99 mole % in the whole) used in Example 1, 0.45 mole of toluenesulfonic acid of Sample No. 1 and 0.06 mole of Sample 2 (methoxybenzenesulfonic acid in which the para compound was included at 98 mole % in the whole) were used. Other than that, the same procedure as Example 1 was carried out to obtain n-butanoln-butanol solution (water content: 0.9%) of 50% of ferric salt of: toluenesulfonic acid in which the para compound was included at 99 mole % in the whole, methoxybenzenesulfonic acid in which the para compound was included at 98 mole % in the whole, and sulfuric acid, which can be used as an agent serving as oxidant and dopant for conductive polymer production.

With respect to the obtained ferric salt of the toluenesulfonic acid, the methoxybenzenesulfonic acid and sulfuric acid, the properties were measured in the same manner as Example 1. The sulfuric acid amount was 0.4% in the total acids. The inorganic alkali amount was 98 ppm. The organic alkali amount was 0.001 mole % or less (less than the detection limit). The pH was 1.62.

Example 5

Instead of n-butanol used in Example 1, ethanol was used. Other than that, the same procedure as Example 1 was carried out to obtain an ethanol solution (water content: 0.9%) of 50% of ferric salt of: toluenesulfonic acid in which the para compound was included at 99 mole % in the whole, and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.3% in the total acids. The inorganic alkali amount was 89 ppm. The organic alkali amount was 0.001 mole % or less (less than the detection limit). The pH was 1.60.

Example 6

Instead of n-butanol used in Example 1, methanol was used. Other than that, the same procedure as Example 1 was carried out to obtain a methanol solution (water content: 1.1%) of 50% of ferric salt of: toluenesulfonic acid in which the para compound was included at 99 mole % in the whole, and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.3% in the total acids. The inorganic alkali amount was 103 ppm. The organic alkali amount was 0.001 mole % or less (less than the detection limit). The pH was 1.60.

Comparative Example 1

Instead of 0.51 mole of Sample No. 1 (toluenesulfonic acid in which the para compound was included at 99 mole % in the whole) used in Example 1, Sample 3 (toluenesulfonic acid in which the para compound was included at 85 mole % in the whole) was used. Other than that, the same procedure as Example 1 was carried out to obtain n-butanoln-butanol solution (water content: 0.9%) of 50% of ferric salt of toluenesulfonic acid (the para compound being included at 85 mole % in the whole) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.4% in the total acids. The inorganic alkali amount was 92 ppm. The organic alkali amount was 0.001 mole % or less (less than the detection limit). The pH was 1.65.

Comparative Example 2

Instead of repeating the "washing" step to remove the excess wader-soluble salt four times in the process to obtain the ferric hydroxide in Example 1, the "washing" step was repeated two times. Other than that, the same procedure as Example 1 was carried out to obtain n-butanoln-butanol solution (water content: 0.9%) of 50% of the ferric salt of toluenesulfonic acid (the para compound being included at 99 mole % in the whole) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 1.8% in the total acids. The inorganic alkali amount was 520 ppm. The organic alkali amount was 0.001 mole % or less (less than the detection limit). The pH was 1.32.

Comparative Example 3

Instead of Sample No. 1 (toluenesulfonic acid in which the para compound was included at 99 mole % in the whole) used in Example 1, Sample 4 (methoxybenzenesulfonic acid in which the para compound was included at 86 mole % in the whole) was used. In addition, instead of repeating the "washing" step to remove the excess water-soluble salt four times in the process to obtain the ferric hydroxide in Example 1, the "washing" step was repeated two times. Other than that, the same procedure as Example 1 was carried out to obtain n-butanoln-butanol solution (water content: 0.9%) of 50% of ferric salt of methoxybenzenesulfonic acid (the para compound being included at 86 mole % in the whole) and sulfuric acid, which can be used as an agent serving as oxidant and dopant for conductive polymer production.

With respect to the obtained ferric salt of the methoxybenzenesulfonic acid and sulfuric acid, the properties were measured in the same manner as Example 1. The sulfuric acid amount was 1.6% in the total acids. The inorganic alkali amount was 480 ppm. The organic alkali amount was 0.001 mole % or less (less than the detection limit). The pH was 1.36.

Comparative Example 4

Instead of 0.51 mole of Sample No. 1 (toluenesulfonic acid in which the para compound was included at 99 mole % in the whole) used in Example 1, the amount of Sample No. 1 was increased into 0.54 mole. Other than that, the same procedure as Example 1 was carried out to obtain n-butanoln-butanol solution (water content: 0.9%) of 50% of ferric salt of toluenesulfonic acid (the para compound being included at 99 mole % in the whole) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.4% in the total acids. The inorganic alkali amount was 109 ppm. The organic alkali amount was 0.001 mole % or less (less than the detection limit). The pH was 1.40.

Comparative Example 5

Instead of 0.51 mole of Sample No. 1 (toluenesulfonic acid in which the para compound was included at 99 mole % in the whole) used in Example 1, the amount of Sample No. 1 was increased into 0.58 mole. Other than that, the same procedure as Example 1 was carried out to obtain n-butanoln-butanol solution (water content: 0.9%) of 50% of ferric salt of toluenesulfonic acid (the para compound being included at 99 mole % in the whole) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.4% in the total acids. The inorganic alkali amount was 94 ppm. The organic alkali amount was 0.001 mole % or less (less than the detection limit). The pH was 1.28.

Comparative Example 6

Instead of 0.51 mole of Sample No. 1 (toluenesulfonic acid in which the para compound was included at 99 mole % in the whole) used in Example 1, the amount of Sample No. 1 was increased into 0.62 mole. Other than that, the same procedure as Example 1 was carried out to obtain n-butanoln-butanol solution (water content: 0.9%) of 50% of ferric salt of toluenesulfonic acid (the para compound being included at 99 mole % in the whole) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.4% in the total acids. The inorganic alkali amount was 99 ppm. The organic alkali amount was 0.001 mole % or less (less than the detection limit). The pH was 1.15.

Comparative Example 7

Instead of $Fe_2(SO_4)_3 \cdot 8H_2O$ used in Example 1, $Fe(NO_3)_3$ was used. Other than that, the same procedure as Example 1 was carried out to obtain n-butanoln-butanol solution (water content: 0.9%) of 50% of ferric salt of toluenesulfonic acid (the para compound being included at 99 mole % in the whole) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0% in the total acids. The inorganic alkali amount was 111 ppm. The organic alkali amount was 0.001 mole % or less (less than the detection limit). The pH was 1.61.

Comparative Example 8

Except for adding imidazole in order to adjust the 8% solution to have a pH of 2.10, the same procedure as Example 1 was carried out to obtain n-butanoln-butanol solution (water content: 0.9%) of 50% of ferric salt of toluenesulfonic acid (the para compound being included at 99 mole % in the whole) and sulfuric acid, which can be used as an agent serving as oxidant and dopant for preparing a conductive polymer.

With respect to the obtained ferric salt of the toluenesulfonic acid and sulfuric acid, the properties were measured in the same manner as Example 1. The sulfuric acid amount was 0.3% in the total acids. The inorganic alkali amount was 105 ppm. The organic alkali amount was 0.02 mole %. The pH was 2.10.

Comparative Example 9

Imidazole was added in order to adjust the 8% solution to have a pH of 1.75, and instead of repeating the "washing" step to remove the excess water-soluble salt four times in the process to obtain the ferric hydroxide in Example 1, the "washing" step was repeated three times. Other than these differences, the same procedure as Example 1 was carried out to obtain n-butanol solution (water content: 0.9%) of 50% of ferric salt of toluenesulfonic acid (the para compound being included at 99 mole % in the whole) and sulfuric acid, which can be used as an agent serving as oxidant and dopant for conductive polymer production.

With respect to the obtained ferric salt of the toluenesulfonic acid and sulfuric acid, the properties were measured in the same manner as Example 1. The sulfuric acid amount was 0.9% in the total acids. The inorganic alkali amount was 220 ppm. The organic alkali amount was 0.02 mole %. The pH was 1.75.

Table 1 summarizes the kinds of the benzenesulfonic acids for conductive polymer production as agents serving as oxidant and dopant, the content of the para compound, the sulfuric acid content, the inorganic alkali amount (i.e., the total amount of the alkali metal and alkali earth metal as inorganic alkali components), and the organic alkali amount (i.e., the total amount of ammonia and amines as organic alkali components), and pH value (i.e., the pH value of the 8% solution as prepared). Note that in Table 1, as to the kinds of the benzenesulfonic acid derivatives, "TS" represents toluenesulfonic acid, and "MBS" represents methoxybenzenesulfonic acid.

TABLE 1

| | Benzenesulfonic acid derivative | Content of para compound (mole %) | Content of sulfuric acid (%) | Inorganic alkali amount (ppm) | Organic alkali amount (mole %) | pH |
|---|---|---|---|---|---|---|
| Example 1 | TS | 99 | 0.8 | 105 | <0.001 | 1.59 |
| Example 2 | TS | 99 | 0.4 | 38 | <0.001 | 1.80 |
| Example 3 | MBS | 98 | 0.8 | 110 | <0.001 | 1.70 |
| Example 4 | TS + MBS | 99 + 98 | 0.8 | 98 | <0.001 | 1.62 |
| Example 5 | TS | 99 | 0.6 | 89 | <0.001 | 1.60 |
| Example 6 | TS | 99 | 0.6 | 103 | <0.001 | 1.60 |
| Comparative Example 1 | TS | 85 | 0.8 | 92 | <0.001 | 1.65 |
| Comparative Example 2 | TS | 99 | 3.6 | 520 | <0.001 | 1.32 |
| Comparative Example 3 | MBS | 86 | 3.2 | 480 | <0.001 | 1.36 |
| Comparative Example 4 | TS | 99 | 0.8 | 109 | <0.001 | 1.40 |
| Comparative Example 5 | TS | 99 | 0.8 | 94 | <0.001 | 1.28 |
| Comparative Example 6 | TS | 99 | 0.8 | 99 | <0.001 | 1.15 |
| Comparative Example 7 | TS | 99 | 0 | 111 | <0.001 | 1.61 |
| Comparative Example 8 | TS | 99 | 0.6 | 105 | 0.02 | 2.10 |
| Comparative Example 9 | TS | 99 | 0.9 | 220 | 0.02 | 1.75 |

As shown in Table 1, in Examples 1 to 6, the para compound was included at an amount of 90 mole % or more; sulfuric acid was contained between 0.05 and 1.5%; the inorganic alkali amount was 300 ppm or less; the organic alkali amount was 0.01 mole % or less; and pH was between 1.5 and 3.0. On the contrary, Comparative Example 1 had a content of the para compound at an amount of less than 90 mole %; Comparative Example 2 had a sulfuric acid content of more than 1.5%, an inorganic alkali amount of more than 300 ppm, and a pH value of less than 1.5; Comparative Example 3 had a content of the para compound at an amount of less than 90 mole %, a sulfuric acid content of more than 1.5%, an inorganic alkali amount of more than 300 ppm, and a pH value of less than 1.5; Comparative Examples 4 to 6 had a pH value of less than 1.5; Comparative Example 7 did not include sulfuric acid; Comparative Example 8 had an organic alkali amount of more than 0.01 mole %; and Comparative Example 9 had an organic alkali amount of more than 0.01 mole %.

Evaluation of Storage Preservation of Alcohol Solution of the Agent Serving as Oxidant and Dopant:

Each alcohol solution of the agent serving as oxidant and dopant prepared in accordance with Examples 1 to 6 and Comparative Example 1 to 9 was put in a 50 ml vial and sealed, which was kept at 25° C. for six months to observe with naked eyes the period until precipitates were generated. The results are shown in Table 2.

TABLE 2

| | Storage Preservation |
|---|---|
| Example 1 | More than 6 months |
| Example 2 | More than 6 months |
| Example 3 | More than 6 months |
| Example 4 | More than 6 months |
| Example 5 | More than 6 months |
| Example 6 | More than 6 months |
| Comparative Example 1 | More than 6 months |
| Comparative Example 2 | More than 6 months |
| Comparative Example 3 | 4 months |
| Comparative Example 4 | More than 6 months |

TABLE 2-continued

| | Storage Preservation |
|---|---|
| Comparative Example 5 | More than 6 months |
| Comparative Example 6 | More than 6 months |
| Comparative Example 7 | More than 6 months |
| Comparative Example 8 | 1 month |
| Comparative Example 9 | More than 6 months |

As shown in Table 2, precipitates did not generate in the alcohol solution of the agent serving as oxidant and dopant prepared as Examples 1 to 6 even after six months passed at 25° C. Thus, they were excellent in storage preservation property.

Examples 7 to 12 and Comparative Examples 10 to 18

Evaluation as to Preparing a Conductive Polymer

In Examples 7 to 12 and Comparative Examples 10 to 18, evaluation was made with respect to the conductive polymer prepared by using the agent serving as oxidant and dopant in accordance with Examples 1 to 6 and Comparative Examples 1 to 9.

As a polymerizable monomer, 3,4-ethylenedioxythiophene (i.e., a thiophene derivative) was used. Into 500 μl of the alcohol solution of the agent serving as oxidant and dopant as prepared in accordance with Examples 1 to 6 and Comparative Examples 1 to 9, 60 μl of 3,4-ethylenedioxythiophene was added. By fully stirring, oxidation polymerization of 3,4-ethylenedioxythiophene was started. Immediately thereafter, they were dropped on a ceramics plate having a size of 3 cm×5 cm at an amount of 180 μl. At a relative humidity of 60% and at a temperature of 25° C., the polymerization reaction was continued for three hours. Then, the ceramics plate was immersed into water for washing, which was then dried at 130° C. for 30 minutes so as to obtain a sheet form of conductive polymer including a polymer component of 3,4-ethylenedioxythiophene on a ceramics plate. Then, a load of 1.5 tons was applied on the sheet form of the conductive polymer on the ceramics plate, keeping for five minutes in order to equalize the pressure applied on the sheet, and then, a conductivity of the conductive polymer was measured by using a measurer in a four prove type (MCP-T600 manufactured by Mitsubishi Chemical Corporation). The results are shown in Table 3.

TABLE 3

| | Agent serving as oxidant and dopant | Conductivity (S/cm) |
|---|---|---|
| Example 7 | Example 1 | 102 |
| Example 8 | Example 2 | 108 |
| Example 9 | Example 3 | 110 |
| Example 10 | Example 4 | 100 |
| Example 11 | Example 5 | 115 |
| Example 12 | Example 6 | 112 |
| Comparative Example 10 | Comparative Example 1 | 61 |
| Comparative Example 11 | Comparative Example 2 | 51 |
| Comparative Example 12 | Comparative Example 3 | 52 |
| Comparative Example 13 | Comparative Example 4 | 69 |
| Comparative Example 14 | Comparative Example 5 | 57 |
| Comparative Example 15 | Comparative Example 6 | 43 |
| Comparative Example 16 | Comparative Example 7 | 52 |
| Comparative Example 17 | Comparative Example 8 | Polymerization did not complete. |
| Comparative Example 18 | Comparative Example 9 | 30 |

As clearly shown in Table 3, the conductive polymers of Examples 7 to 12, prepared by using the agents serving as oxidant and dopant of Examples 1 to 6, respectively, had a high conductivity compared with the conductive polymers of Comparative Examples 10 to 16 and 18 prepared in accordance with the agent serving as oxidant and dopants of Comparative Examples 1 to 7 and 9, respectively.

Examples 13 to 18 and Comparative Examples 19 to 27

Evaluation as to Aluminum Winding Type Solid Electrolytic Capacitors

In Examples 13 to 18 and Comparative Examples 19 to 27, the agent serving as oxidant and dopant in accordance with Examples 1 to 6 and Comparative Examples 1 to 9 was used to prepare a conductive polymer, which was used as a solid electrolyte of an aluminum winding type solid electrolytic capacitor for evaluation. Note that the oxidation polymerization for preparing the conductive polymer was carried out in the process during manufacturing the aluminum winding type solid electrolytic capacitor.

After the surface of the aluminum foil was subjected to an etching treatment, a chemical conversion treatment was applied to attach a lead terminal on the positive electrode forming a dielectric layer of an oxidation film of aluminum, as well as attach another lead terminal on the negative electrode of aluminum foil. There positive and negative electrodes, each having the lead terminal, were winded together with a separator to manufacture a capacitor element.

Next, the step in which the capacitor element was immersed into an ethanol solution of 30% 3,4-ethylenedioxythiophene was then taken was repeated twice. Then, into each alcohol solution of the agent serving as oxidant and dopant in accordance with Examples 1 to 6 and Comparative Examples 1 to 9, the capacitor element was immersed, respectively, and then taken out, and subsequently, heated at 150° C. for six hours to cause oxidation polymerization of 3,4-ethylenedioxythiophene to form a solid electrolyte layer of a conductive polymer (i.e., a conductive polymer including a polymer component of 3,4-ethylenedioxythiophene). The outside thereof was wrapped with a jacket material to manufacture an aluminum winding type solid electrolytic capacitor.

With respect to the aluminum winding type solid electrolytic capacitor as manufactured above, ESR and capacitance were measured by the following methods. The results are shown in Table 4.

ESR:

Using LCR meter (4284A) manufactured by Hewlett-Packard Corporation, ESR was measured at 25° C. and at 100 kHz.

Capacitance:

Using LCR meter (4284A) manufactured by Hewlett-Packard Corporation, capacitance was measured at 25° C. and at 120 Hz.

The numeric values of ESR and capacitance shown in Table 4 are obtained by averaging twenty units with decimal figures rounded-off.

TABLE 4

| | Agent serving as oxidant and dopant | ESR (mΩ) | Capacitance (µF) |
|---|---|---|---|
| Example 13 | Example 1 | 25 | 109 |
| Example 14 | Example 2 | 25 | 107 |
| Example 15 | Example 3 | 26 | 108 |
| Example 16 | Example 4 | 27 | 105 |
| Example 17 | Example 5 | 25 | 109 |
| Example 18 | Example 6 | 25 | 107 |
| Comparative Example 19 | Comparative Example 1 | 32 | 104 |
| Comparative Example 20 | Comparative Example 2 | 35 | 98 |
| Comparative Example 21 | Comparative Example 3 | 38 | 97 |
| Comparative Example 22 | Comparative Example 4 | 40 | 95 |
| Comparative Example 23 | Comparative Example 5 | 38 | 95 |
| Comparative Example 24 | Comparative Example 6 | 34 | 97 |
| Comparative Example 25 | Comparative Example 7 | 34 | 99 |
| Comparative Example 26 | Comparative Example 8 | 699 | 35 |
| Comparative Example 27 | Comparative Example 9 | 98 | 68 |

As shown in Table 4, the aluminum winding type solid electrolytic capacitors in accordance with Examples 13 to 18 were excellent, having a small ESR value and a large capacitance compared with the aluminum winding type solid electrolytic capacitors in accordance with Comparative Examples 19 to 27.

Next, as to the aluminum winding type solid electrolytic capacitors in accordance with Examples 13 to 18 and Comparative Examples 19 to 27, twenty units of each, selected at random, were stored at 105° C. for 500 hours, and then, ESR and capacitance were measured. The results are shown in Table 5. Note that the ESR and capacitance shown in Table 5 were ones obtained by averaging twenty units with decimal figures rounded-off.

TABLE 5

| | Agent serving as oxidant and dopant | ESR (mΩ) | Capacitance (µF) |
|---|---|---|---|
| Example 13 | Example 1 | 26 | 105 |
| Example 14 | Example 2 | 26 | 104 |
| Example 15 | Example 3 | 28 | 106 |

TABLE 5-continued

| | Agent serving as oxidant and dopant | ESR (mΩ) | Capacitance (μF) |
|---|---|---|---|
| Example 16 | Example 4 | 28 | 103 |
| Example 17 | Example 5 | 27 | 104 |
| Example 18 | Example 6 | 26 | 104 |
| Comparative Example 19 | Comparative Example 1 | 36 | 100 |
| Comparative Example 20 | Comparative Example 2 | 37 | 95 |
| Comparative Example 21 | Comparative Example 3 | 40 | 94 |
| Comparative Example 22 | Comparative Example 4 | 42 | 97 |
| Comparative Example 23 | Comparative Example 5 | 40 | 93 |
| Comparative Example 24 | Comparative Example 6 | 36 | 95 |
| Comparative Example 25 | Comparative Example 7 | 36 | 96 |
| Comparative Example 26 | Comparative Example 8 | 2783 | 19 |
| Comparative Example 27 | Comparative Example 9 | 143 | 49 |

As shown in Table 5, even after storing them for an extended term at a high temperature, the aluminum winding type solid electrolytic capacitors in accordance with Examples 13 to 18 showed that the increase of the ESR and the decreased of the capacitance were little, so that they were excellent in heat resistance, having a high reliability at a high temperature.

Examples 19 to 21 and Comparative Examples 28 to 30

Evaluation on Tantalum Solid Electrolytic Capacitors

In Examples 19 to 21 and Comparative Examples 28 to 30, the agent serving as oxidant and dopant in accordance with Examples 2, 5 and 6 and Comparative Examples 3, 6 and 7 were used to prepare a conductive polymer, which was used as a manufactured into a solid electrolyte of a tantalum solid electrolytic capacitor, and evaluated.

First of all, a tantalum sintered object was immersed into a phosphoric acid aqueous solution, and then, a voltage was applied, to cause electrolytic oxidation. As a result, a dielectric layer of an oxidation film of tantalum was formed on the surface of the tantalum sintered object. Next, in order to carry out chemical oxidative polymerization, the tantalum sintered object, forming a dielectric layer on the surface thereof, was immersed into each of the alcohol solution in accordance of Examples 2, 5 and 6, and Comparative Examples 3, 6 and 7, for a period of five minutes, and then, taken out to dry it at 40° C. for 30 minutes. Then, it was immersed in a monomer, 3,4-ethylenedioxythiophene, for 15 minutes, and then, it was taken out to cause chemical oxidative polymerization at a temperature of about 25° C. and at a relative humidity of about 50%. Then, it was immersed into a 2% aqueous solution of p-toluenesulfonic acid for 60 minutes, and then, it washed with pure water for 30 minutes, and thereafter, dried at 80° C. for 30 minutes. In addition, a step from immersing in the alcohol solution of the agent serving as oxidant and dopant for 5 minutes to washing and dry was repeated ten times, so as to prepare a conductive polymer (i.e., a conductive polymer having a polymer ingredient of 3,4-ethylenedioxythiophene). Then, it was immersed into a phosphoric acid aqueous solution, and then, a voltage was applied to reform the dielectric layer of the oxidation film of tantalum. Then, it was immersed in pure water for 30 minutes, and taken out, which was dried at 60° C. for 60 minutes, and then at 130° C. for 60 minutes. Then, carbon paste and silver paste were applied. The positive electrode lead and the negative electrode lead were thus provided on the positive electrode layer and the negative electrode layer, respectively. An outer shell was formed by an epoxy resin at the circumstances thereof. Finally, an aging treatment was applied to obtain a tantalum solid electrolytic capacitor.

With respect to the tantalum solid electrolytic capacitor as prepared in accordance with Examples 19 to 21 and Comparative Examples 28 to 30, ESR and capacitance were measured in the same manner as explained above. The results are shown in Table 6. Note that the ESR and capacitance shown in Table 6 were ones obtained by averaging twenty units with decimal figures rounded-off.

TABLE 6

| | Agent serving as oxidant and dopant | ESR (mΩ) | Capacitance (μF) |
|---|---|---|---|
| Example 19 | Example 2 | 29 | 153 |
| Example 20 | Example 5 | 29 | 155 |
| Example 21 | Example 6 | 26 | 157 |
| Comparative Example 28 | Comparative Example 3 | 41 | 150 |
| Comparative Example 29 | Comparative Example 6 | 43 | 151 |
| Comparative Example 30 | Comparative Example 7 | 42 | 150 |

As shown in Table 6, the tantalum solid electrolytic capacitor in accordance with Examples 19 to 21 had no difference in the capacitance from the tantalum solid electrolytic capacitor in accordance with Comparative Examples 28 to 30. However, the former had a smaller ESR, so the former was excellent.

What is claimed is:

1. An alcohol solution of the agent serving as oxidant and dopant for conductive polymer production, comprising:
   an alcohol; and
   an agent serving as oxidant and dopant comprising a ferric salt of acids comprising a benzene sulfonic acid derivative represented by formula (1) and sulfuric acid,

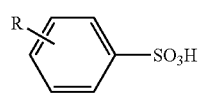

(1)

wherein "R" represents an alkyl or alkoxy group having a carbon number of 1 to 4, wherein more than 90 mole % of the benzene sulfonic acid derivative have R at the para position with respect to the SO$_3$H group,
   wherein sulfuric acid is contained at 0.05 to 1.5 mass % in the acids,
   wherein an alkali metal and alkali earth metal as an inorganic alkali component are included at a total content between 38 ppm and 300 ppm (based on mass),
   wherein ammonia and an amine as an organic alkali component are included at a total content of 0.01 mole % or less, and
   wherein a pH value is 1.5 to 3.0 when the agent serving as oxidant and dopant is made into an aqueous solution at a concentration of 8 mass %,
   wherein the agent serving as oxidant and dopant is solved in the alcohol at a concentration of 30 mass % or more, wherein the alcohol solution has a water content of 5 mass % or less.

2. An alcohol solution of the agent serving as oxidant and dopant for conductive polymer production according to claim 1, wherein the benzene sulfonic acid derivative is 4-methylbenzenesulfonic acid or 4-methoxybenzenesulfonic acid.

3. An alcohol solution of the agent serving as oxidant and dopant for conductive polymer production according to claim 1, wherein the alcohol is at least one selected from the group consisting of methanol, ethanol and butanol.

4. A conductive polymer obtained by performing an oxidation polymerization of a polymerizable monomer by using the alcohol solution of the agent serving as oxidant and dopant for conductive polymer production according to claim 1.

5. A conductive polymer according to claim 4, wherein the polymerizable monomer is 3,4-ethylenedioxythiophene.

6. A solid electrolytic capacitor characterized in using the conductive polymer according to claim 4 as a solid electrolyte.

7. An alcohol solution of the agent serving as oxidant and dopant for conductive polymer production, comprising:
   an alcohol; and
   an agent serving as oxidant and dopant solved in the alcohol at a concentration of 30 mass % or more,
   wherein the agent serving as oxidant and dopant comprising:
      a ferric salt of a benzene sulfonic acid derivative represented by formula (1),

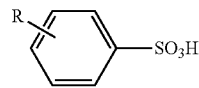

(1)

wherein "R" represents an alkyl or alkoxy group having a carbon number of 1 to 4, wherein more than 90 mole % of the benzene sulfonic acid derivative have R at the para position with respect to the $SO_3H$ group, and a ferric salt of sulfuric acid, wherein the sulfuric acid is contained at 0.05 to 1.5 mass % in a total of the acids, wherein an alkali metal and alkali earth metal as an inorganic alkali component are included at a total content between 38ppm and 300ppm (based on mass), wherein ammonia and an amine as an organic alkali component are included at a total content of 0.01 mole% or less, and wherein a pH value is 1.5 to 3.0 when the agent serving as oxidant and dopant is made into an aqueous solution at a concentration of 8 mass %, wherein the alcohol solution has a water content of 5 mass % or less.

8. An alcohol solution according to claim 7, wherein the benzene sulfonic acid derivative is 4-methylbenzenesulfonic acid or 4-methoxybenzenesulfonic acid.

9. An alcohol solution according to claim 7, wherein the alcohol is at least one selected from the group consisting of methanol, ethanol and butanol.

10. A conductive polymer obtained by performing an oxidation polymerization of 3,4-ethylenedioxythiophene by using the alcohol solution according to claim 7.

11. A solid electrolytic capacitor comprising the conductive polymer according to claim 10 as a solid electrolyte.

* * * * *